United States Patent [19]
Woodward

[11] Patent Number: 5,553,896
[45] Date of Patent: Sep. 10, 1996

[54] ELECTRICALLY INSULATED FLUID COUPLING ASSEMBLY

[75] Inventor: Frederick W. Woodward, Dexter, Mich.

[73] Assignee: Pilot Industries, Inc., Dexter, Mich.

[21] Appl. No.: 389,120

[22] Filed: Feb. 15, 1995

[51] Int. Cl.⁶ .................................................. F16L 11/12
[52] U.S. Cl. ........................... 285/47; 285/242; 285/248; 285/256; 285/921
[58] Field of Search ................................. 285/50, 53, 54, 285/242, 246, 382, 921, 47, 245, 247, 248, 256, 149; 174/47, 74 A, 74 R, 83; 439/271, 272

[56] References Cited

U.S. PATENT DOCUMENTS

| | | |
|---|---|---|
| 533,913 | 2/1895 | Mount . |
| 1,532,395 | 4/1925 | Fulton ..................................... 285/246 |
| 1,588,606 | 6/1926 | Oden . |
| 1,592,175 | 7/1926 | Boyd . |
| 1,969,203 | 8/1934 | Cadden et al. ........................ 29/148.2 |
| 2,465,669 | 3/1949 | Tudor ...................................... 285/17 |
| 2,486,113 | 10/1949 | Campbell et al. ...................... 285/168 |
| 2,686,337 | 8/1954 | Kaufman ................................ 285/242 |
| 2,962,304 | 11/1960 | Lung ....................................... 285/48 |
| 3,860,742 | 1/1975 | Medney ................................... 174/84 |
| 4,229,613 | 10/1980 | Braun ....................................... 174/47 |
| 4,275,769 | 6/1981 | Cooke ................................. 285/149 X |
| 4,367,889 | 1/1983 | Redl ...................................... 285/149 |
| 4,384,222 | 5/1983 | Zerlik ........................................ 310/61 |
| 4,660,867 | 4/1987 | Kemper et al. ........................ 285/256 |
| 4,675,780 | 6/1987 | Barnes et al. .......................... 361/215 |
| 4,693,323 | 9/1987 | Owensby ............................ 285/149 X |
| 4,776,600 | 10/1988 | Kohn ...................................... 277/101 |
| 4,870,535 | 9/1989 | Matsumoto ............................ 361/215 |
| 5,039,133 | 8/1991 | Albrecht ................................ 285/921 |
| 5,102,012 | 4/1992 | Foster ..................................... 222/40 |
| 5,143,122 | 9/1992 | Adkins .................................. 174/47 X |
| 5,222,770 | 6/1993 | Helevirta ................................. 285/53 |
| 5,261,706 | 11/1993 | Bartholomew ........................ 285/242 |
| 5,295,864 | 3/1994 | Birch et al. ......................... 439/271 X |
| 5,430,603 | 7/1995 | Albino et al. ........................ 174/47 X |

FOREIGN PATENT DOCUMENTS

| | | | |
|---|---|---|---|
| 754513 | 11/1966 | Canada .................................... 285/50 |
| 1350027 | 12/1962 | France ................................... 285/242 |
| 352206 | 3/1961 | Switzerland .......................... 285/242 |
| 561283 | 5/1944 | United Kingdom .................. 285/256 |
| 1248395 | 9/1971 | United Kingdom .................. 285/256 |
| 93/16317 | 8/1993 | WIPO .................................... 285/256 |

Primary Examiner—Terry Lee Melius
Assistant Examiner—Heather Chun Shackelford
Attorney, Agent, or Firm—Gifford, Krass, Groh, Sprinkle, Patmore, Anderson & Citkowski, P.C.

[57] ABSTRACT

An electrically insulated fluid coupling assembly is provided having a female portion of the fluid coupling constructed of an electrically conductive material and having an elongated tubular stem. The assembly includes a fluid conduit having an inner liner constructed of an electrically insulating material or in some cases a low level conductive material surrounded by a layer constructed of an electrically conductive material, such as a metal braiding. An elastomeric covering is also provided around the metal braiding. The coupling stem is insertable into the inner layer of the conduit while a tubular ferrule constructed of an electrically conductive material is disposed around the stem as well as one end of the conduit. Furthermore, the ferrule compresses the conduit between the stem and the ferrule thus connecting the fluid coupling and conduit together. An electrical insulator ring has an axial portion coaxially disposed in one end of the ferrule and a radially outwardly extending portion which covers at least a portion of one axial end of the stem. The insulator ring electrically insulates the coupling from the metal braid on the fluid conduit.

10 Claims, 1 Drawing Sheet

ELECTRICALLY INSULATED FLUID COUPLING ASSEMBLY

BACKGROUND OF THE INVENTION

1. Field of the Invention

The present invention relates generally to fluid coupling assemblies and, more particularly, to an electrically insulated fluid coupling assembly.

2. Description of Prior Art

There are many previously known fluid coupling assemblies in which a fluid coupling has a female portion with an elongated stem that is inserted into the interior of one end of the fluid conduit. The coupling and the conduit are then secured together by a ferrule which sandwiches the end of the fluid conduit against the coupling stem.

In many applications, for example automotive applications, the fluid conduit comprises an inner layer constructed of an electrically insulating material or low level conductive material, such as a polymer, which is surrounded by a metal braid. This metal braid not only adds rigidity to the fluid coupling but also protects the fluid conduit from abrasion, impact and the like. The metal braid, in turn, is optionally enclosed in an elastomeric sheath. Such fluid couplings are used, for example, in brake lines in automotive vehicles, commercial vehicles and agricultural equipment.

One disadvantage of these previously known couplings is that the ferrule which connects the fluid coupling to the conduit is constructed of metal for high strength. This ferrule contacts not only the metal female portion of the fluid coupling, but also the metal braid. In doing so, the ferrule completes the electrical connection or circuit from the metal braid to the fluid coupling.

Consequently, in the event that a voltage is applied to the fluid coupling assembly, the ferrule completes the electrical circuit through the fluid coupling so the current flows not only through the coupling, but also through the metal braid of the conduit. In doing so, resistive heating of the fluid conduit can occur and melt or otherwise damage the inner liner of the fluid conduit. When this occurs, the overall integrity of the fluid system is compromised which can create not only system malfunction, but also a potentially hazardous safety condition. This is particularly true in fuel or other combustible liquid systems since the metal braid can become "cherry red hot."

SUMMARY OF THE PRESENT INVENTION

The present invention provides an electrically insulated fluid coupling assembly which overcomes all of the above-mentioned disadvantages of the previously known devices.

In brief, the fluid coupling assembly of the present invention, like the previously known devices, includes a fluid coupling having a female portion with an elongated stem constructed of metal. The stem of the fluid coupling is inserted into one end of the fluid conduit and thus into the inner non-conductive or low level conductive layer of conduit. As with the previously known conduits, a metal braid and outer elastomeric sheath surrounds the inner non-conductive layer while a metal ferrule sandwiches the end of the fluid conduit between the ferrule and the coupling stem to secure the coupling and conduit together.

Unlike the previously known devices, however, the present invention further provides an electrical insulator ring constructed of a non-electrically conductive material, such as plastic. The ring includes an axial portion coaxially disposed on one end of the ferrule and a radially outwardly extending portion which covers at least a portion of one axial end of the ferrule. In doing so, the insulator ring electrically insulates the ferrule from the female portion of the coupling thereby breaking the electrical conductive path along the fluid coupling assembly.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
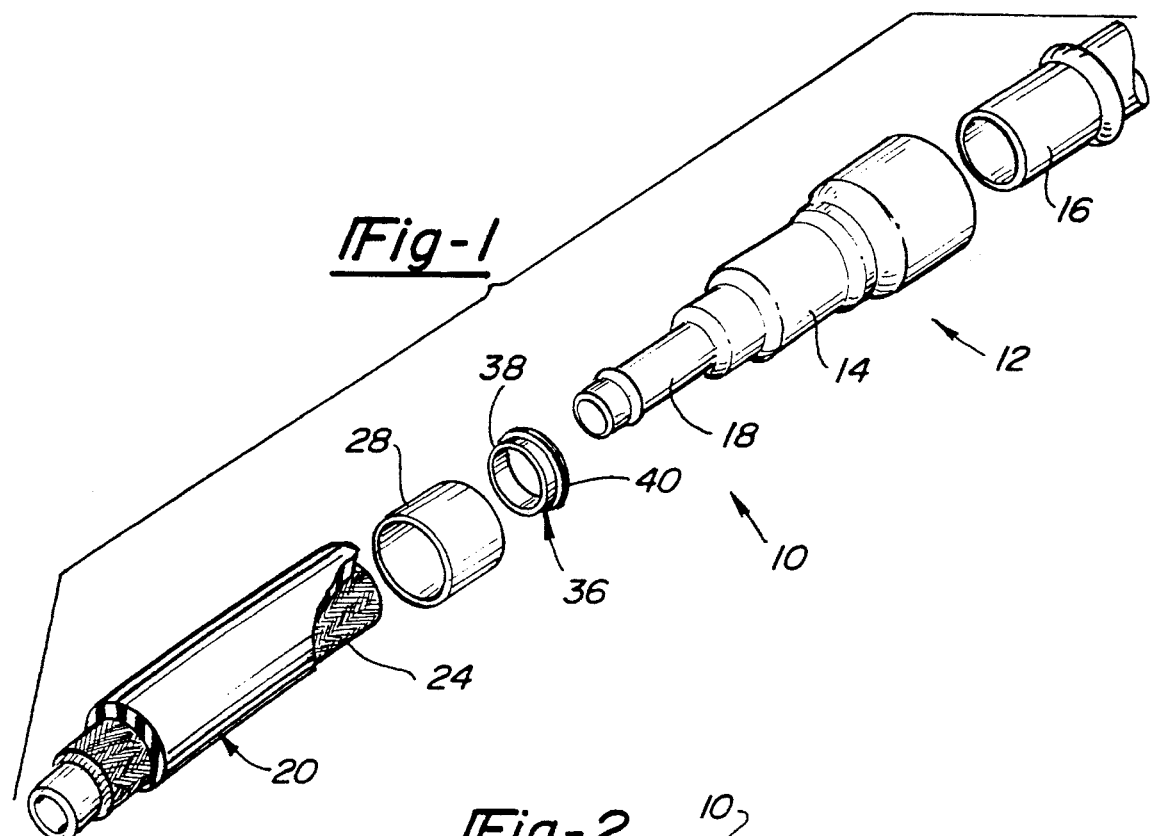
FIG. 1 is an exploded fragmentary view illustrating a preferred embodiment of the present invention.

With reference to the drawing, the preferred embodiment of the fluid coupling assembly 10 of the present invention is thereshown and comprises a fluid coupling 12 having a female portion 14 and a male portion 16. The female portion 14 is made of an electrically conductive material, such as metal, and includes an elongated stem 18. Furthermore, the fluid coupling 12 is of the quick connect type commonly used in the automotive and other industries.

The fluid coupling assembly 10 further includes a fluid conduit 20 having an inner liner 22 constructed of an electrical insulating material, such as a polymer. A layer 24 of an electrically conductive material, such as metal braiding, surrounds the inner layer 22. The metal braiding 24 not only adds rigidity to the conduit 20, but also protects the inner layer 22 from abrasion, impact and the like. An outer sheath 26 constructed of an elastomeric material optionally encases the metal braiding 24.

Figure 2:
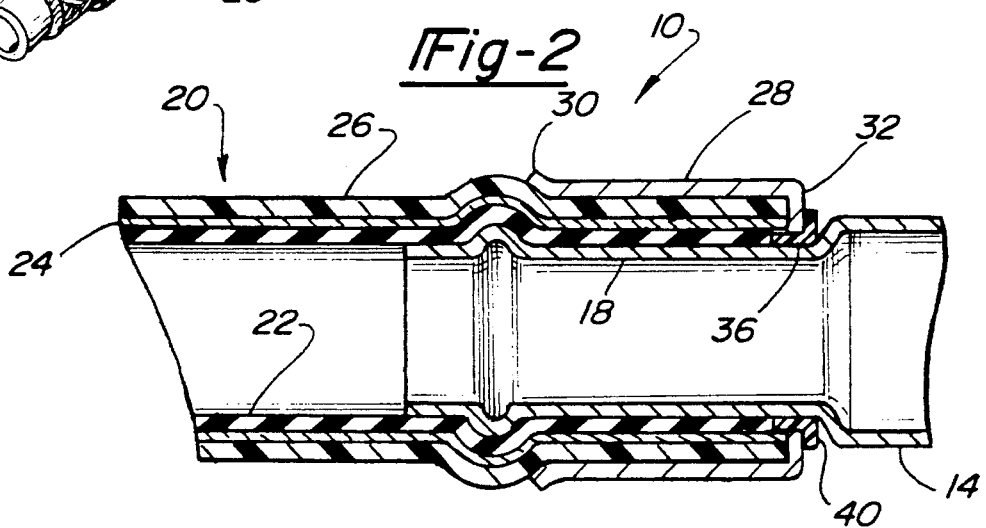
FIG. 2 is a longitudinal sectional view illustrating the preferred embodiment of the present invention.

With reference now particularly to FIG. 2, in order to secure the female portion 14 of the coupling 12 to the conduit 20, the coupling stem 18 is inserted into the interior of the conduit 20 and thus into the interior of the inner layer 22. A tubular metal ferrule 28 open at each end 30 and 32 is then provided around the end 34 of the fluid conduit 20 so that the end 34 of the fluid conduit 20 is sandwiched in between the ferrule 28 and coupling stem 18. In doing so, the ferrule 28 mechanically secures the conduit 20 and the female portion 14 of the coupling 12 together. Furthermore, as best shown in FIG. 2, the ferrule end 32 is inwardly turned and overlies the end of the conduit 20.

The ferrule 28, like the coupling 12, is constructed of an electrically conductive material, such as metal. Furthermore, since the ends of the metal braid 24 frequently protrude outwardly from the end of the coupling 20 and contact the inwardly turned end 32 of the ferrule 28, the ferrule 28 is electrically connected to the metal braid 24.

Referring again to FIGS. 1 and 2, in order to break the electrical path between the ferrule 28 and the female portion 14 of the coupling 12, the present invention provides an insulator ring 36. This insulator ring 36 includes an axially extending portion 38 which is coaxially insertable into the end 30 of the ferrule 28. Additionally, the insulator ring 36 includes a radially outwardly extending portion 40 which covers at least a portion of the inwardly turned end 32 of the ferrule 28. In doing so, the insulator ring 36 electrically insulates the ferrule 28 from the female portion 14 of the coupling 12 thereby breaking the electrical path between the coupling 12 and metal braid 24 of the conduit 20.

Figure 3:
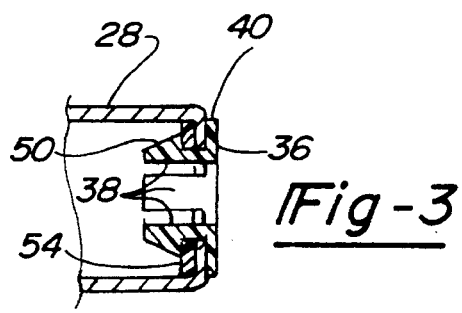
FIG. 3 is a longitudinal view illustrating a further preferred embodiment of the invention and with parts removed for clarity.

With reference now to FIG. 3, an alternate form for the insulator ring 36 is there shown in which the ring 36 includes outwardly extending locking barbs 50 along its axially extending portion 38. These barbs 50 lock the ring 36 to the ferrule 28 by entrapping a portion of the ferrule 28 between the barbs 50 and radial portion 40 upon insertion of the ring 36 into the ferrule. Optionally an insulating washer 52 is entrapped between the barb 50 and ferrule 28 to ensure complete insulation of the ferrule in extreme situations.

Figure 4:
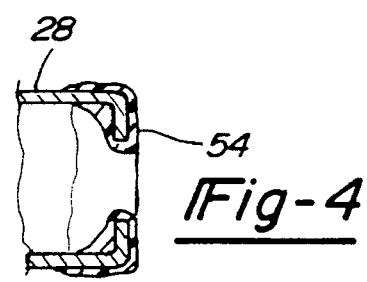
FIG. 4 is similar to FIG. 3 but illustrating a still further embodiment of the present invention.

With reference now to FIG. 4, a still further embodiment of the present invention is thereshown in which at least the portion of the ferrule 28 around its open end is coated with an electrical insulating material 54. Any conventional method, such as dipping, painting, powder coating or other deposition method can be used to coat the ferrule 28.

From the foregoing, it can be seen that the present invention provides a simple, inexpensive and yet totally effective means for electrically insulating a metal fluid coupling from the metal braid and a fluid conduit. Consequently, since the electrically conductive path is broken along the fluid coupling assembly, current flow through the fluid conduit 20 is precluded.

Having described my invention, however, many modifications thereto will become apparent to those skilled in the art to which it pertains without deviations from the spirit of the invention as defined by the scope of the appended claims.

I claim:

1. An electrically insulated fluid coupling assembly comprising:

a fluid coupling having a female portion constructed of an electrically conductive material, said female portion having an elongated tubular stem, a fluid conduit having an inner liner and an outer layer constructed of an electrically conductive material, said coupling stem being insertable into said inner layer of said conduit, a tubular ferrule constructed of an electrically conductive material, said ferrule being open at each end and disposed around said stem so that said ferrule sandwiches an end of said conduit between said ferrule and said stem to thereby secure said female portion of said coupling to said conduit, means for electrically insulating said ferrule from said stem of said female portion wherein said insulating means comprises an electrical insulator ring having an axial portion coaxially disposed in one end of said ferrule and a radially outwardly extending portion which covers at least a portion of one axial end of said ferrule.

2. The invention as defined in claim 1 wherein said ring is made of plastic.

3. The invention as defined in claim 1 wherein said outer layer of said conduit comprises a metal braid.

4. The invention as defined in claim 3 wherein said conduit further comprises an outer sheath of an electrical insulating material, said sheath surrounding said outer layer of said conduit.

5. The invention as defined in claim 1 wherein said coupling is a quick connect coupling.

6. The invention as defined in claim 1 wherein said insulating ring is of a one piece construction.

7. The invention as defined in claim 1 and comprising means for locking said ring to said ferrule.

8. The invention as defined in claims 7 wherein said locking means comprises an outwardly extending locking barb secured to said ring.

9. The invention as defined in claim 8 and comprising a washer made of an electrical insulating material sandwiched between said locking barb and said ferrule.

10. The invention as deigned in claim 1 wherein said insulating means comprises coating an insulating material on at least a portion of said ferrule.

\* \* \* \* \*